(12) United States Patent
Hung et al.

(10) Patent No.: US 10,156,317 B2
(45) Date of Patent: Dec. 18, 2018

(54) FIXING STRUCTURE

(71) Applicant: CAL-COMP BIG DATA, INC., New Taipei (TW)

(72) Inventors: Ming-Hua Hung, New Taipei (TW); Teng-Nan Lo, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 15/437,449

(22) Filed: Feb. 21, 2017

(65) Prior Publication Data

US 2018/0128420 A1   May 10, 2018

(30) Foreign Application Priority Data

Nov. 10, 2016  (CN) .................... 2016 2 1211467 U

(51) Int. Cl.
| | | |
|---|---|---|
| F16M 11/00 | (2006.01) | |
| F16M 13/02 | (2006.01) | |
| F16M 11/08 | (2006.01) | |
| F16M 11/20 | (2006.01) | |
| G06F 1/16 | (2006.01) | |

(52) U.S. Cl.
CPC ............ *F16M 13/02* (2013.01); *F16M 11/08* (2013.01); *F16M 11/2014* (2013.01); *G06F 1/1601* (2013.01); *F16M 2200/068* (2013.01)

(58) Field of Classification Search
CPC ........................... B60R 11/02; B60R 11/0241
See application file for complete search history.

(56) References Cited

U.S. PATENT DOCUMENTS

| | | | | |
|---|---|---|---|---|
| 5,187,744 | A  * | 2/1993 | Richter | ............... B60R 11/0241 224/553 |
| 8,191,838 | B2 * | 6/2012 | Carter | ..................... B60R 11/02 16/367 |
| 8,276,863 | B2 * | 10/2012 | Niwai | ................. B60R 11/0241 224/483 |
| 8,469,325 | B2 * | 6/2013 | Yu | .......................... G10G 5/005 248/231.51 |
| 8,693,172 | B2 * | 4/2014 | Russell | .................. F16M 11/10 248/921 |
| 2008/0006751 | A1 | 1/2008 | Chen et al. | |
| 2011/0019344 | A1 | 1/2011 | Russell et al. | |
| 2012/0043437 | A1 | 2/2012 | Townsend et al. | |

OTHER PUBLICATIONS

"Search Report of Europe Counterpart Application", dated Nov. 22, 2017, p. 1-p. 7, in which the listed references were cited.

* cited by examiner

*Primary Examiner* — Amy J. Sterling
(74) *Attorney, Agent, or Firm* — JCIPRNET

(57) ABSTRACT

A fixing structure, adapted to fix an electronic device on a carrying plane is provided, and the fixing structure includes a fixing plate, a carrying frame, a first pivot portion, a second pivot portion and a connection portion. The fixing plate is disposed on the carrying plane, and the carrying frame is detachably disposed on a back surface of the electronic device. The first pivot portion is disposed on the fixing plate at a side opposite to the carrying plane. The second pivot portion is disposed on the carrying frame at a side facing the fixing plate. The first pivot portion and the second pivot portion are respectively pivoted to two opposite sides of the connection portion. The electronic device and the carrying frame are adapted to be pivotally rotated relative to the carrying plane and the connection portion through the first pivot portion and the second pivot portion.

8 Claims, 3 Drawing Sheets

FIXING STRUCTURE

CROSS-REFERENCE TO RELATED APPLICATION

This application claims the priority benefit of China application serial no. 201621211467.1, filed on Nov. 10, 2016. The entirety of the above-mentioned patent application is hereby incorporated by reference herein and made a part of this specification.

BACKGROUND OF THE INVENTION

Field of the Invention

The invention relates to a fixing structure, and particularly relates to a fixing structure used for fixing an electronic device.

Description of Related Art

Along with development of technology and improvement of life quality, various display devices and applications thereof such as mobile phones, tablet personal computers (PC) or physiological signal sensing devices are widely applied in daily life. A current electronic device is generally held by hand or placed on a specific platform for usage. Although some of the electronic devices can be used in collaboration with wall-mounted components, the current wall-mounted structures are limited in the way of a hanging method, and a display angle of the wall-mounted electronic devices is also limited. In a specific usage environment, for example, when the aforementioned electronic device is used in a room or a bathroom, the electronic device is hard to move and pivotally rotate relative to a hanging surface to provide various images or supplementary information in different viewing angles. Comparatively, due to the existing hanging structure, a hanging position or an image display angle of the electronic device cannot be effectively adjusted, such that an installation position or the hanging position of the electronic device cannot be flexibly adjusted, and the electronic device cannot be used in collaboration with devices such as a mirror, etc., in the room or the bathroom. Therefore, the current hanging or fixing structure of the electronic device is required to be further improved and designed to cope with various usage situations and demands of the user.

SUMMARY OF THE INVENTION

The invention is directed to a fixing mechanism, which is adapted to carry and fix an electronic device.

The invention provides a fixing structure, which is adapted to fix an electronic device on a carrying plane, and the fixing structure includes a fixing plate, a carrying frame, a first pivot portion, a second pivot portion and a connection portion. The fixing plate is disposed on the carrying plane, and the carrying frame is detachably disposed on a back surface of the electronic device. The first pivot portion is disposed on the fixing plate at a side opposite to the carrying plane. The second pivot portion is disposed on the carrying frame at a side facing the fixing plate. The first pivot portion and the second pivot portion are respectively pivoted to two opposite sides of the connection portion. The electronic device and the carrying frame are adapted to be pivotally rotated relative to the carrying plane and the connection portion through the first pivot portion and the second pivot portion.

In an embodiment of the invention, the carrying frame further has a wire trimming portion disposed on a bottom of the carrying frame. The wire trimming portion is adapted to guide wires of the electronic device to extend towards two sides of the carrying frame.

In an embodiment of the invention, the fixing structure further includes an adhesive member. The adhesive member is disposed between the fixing plate and the carrying plane, and the fixing plate is adhered and fixed to the carrying plane through the adhesive member.

In an embodiment of the invention, a ratio between an area of the fixing plate and an area of the first pivot portion is greater than or equal to 3.

In an embodiment of the invention, the first pivot portion has a first pivot base and a first pivot. The first pivot penetrates through the first pivot base and one of the two opposite sides of the connection portion.

In an embodiment of the invention, the second pivot portion has a second pivot base and a second pivot. The second pivot penetrates through the second pivot base and the other one of the two opposite sides of the connection portion.

In an embodiment of the invention, a configuration position of the first pivot base and the first pivot on the fixing plate is lower than a middle height line of the fixing plate along a vertical direction.

In an embodiment of the invention, the carrying frame has engaging portions. The engaging portions are disposed at an edge of the carrying frame, and the electronic device is engaged to the carrying frame through the engaging portions.

In an embodiment of the invention, a shape of the carrying frame includes a round, an oval, a rectangle, a square, a triangle, a rhombus, a polygon or an irregular polygon.

In an embodiment of the invention, the carrying frame is adapted to be pivotally rotated toward two side edges of the fixing plate by at least 30 degrees through the connection portion and the first pivot portion.

According to the above description, in the embodiments of the invention, the fixing structure is adapted to carry the electronic device and fixing the electronic device on the carrying plane. Moreover, the fixing structure has the first pivot portion and the second pivot portion, such that the electronic device is adapted to be pivotally rotated relative to the carrying plane, and the electronic device may be pivotally rotated relative to the connection portion through the second pivot portion, so as to adjust an angle of a display image of the electronic device used by the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
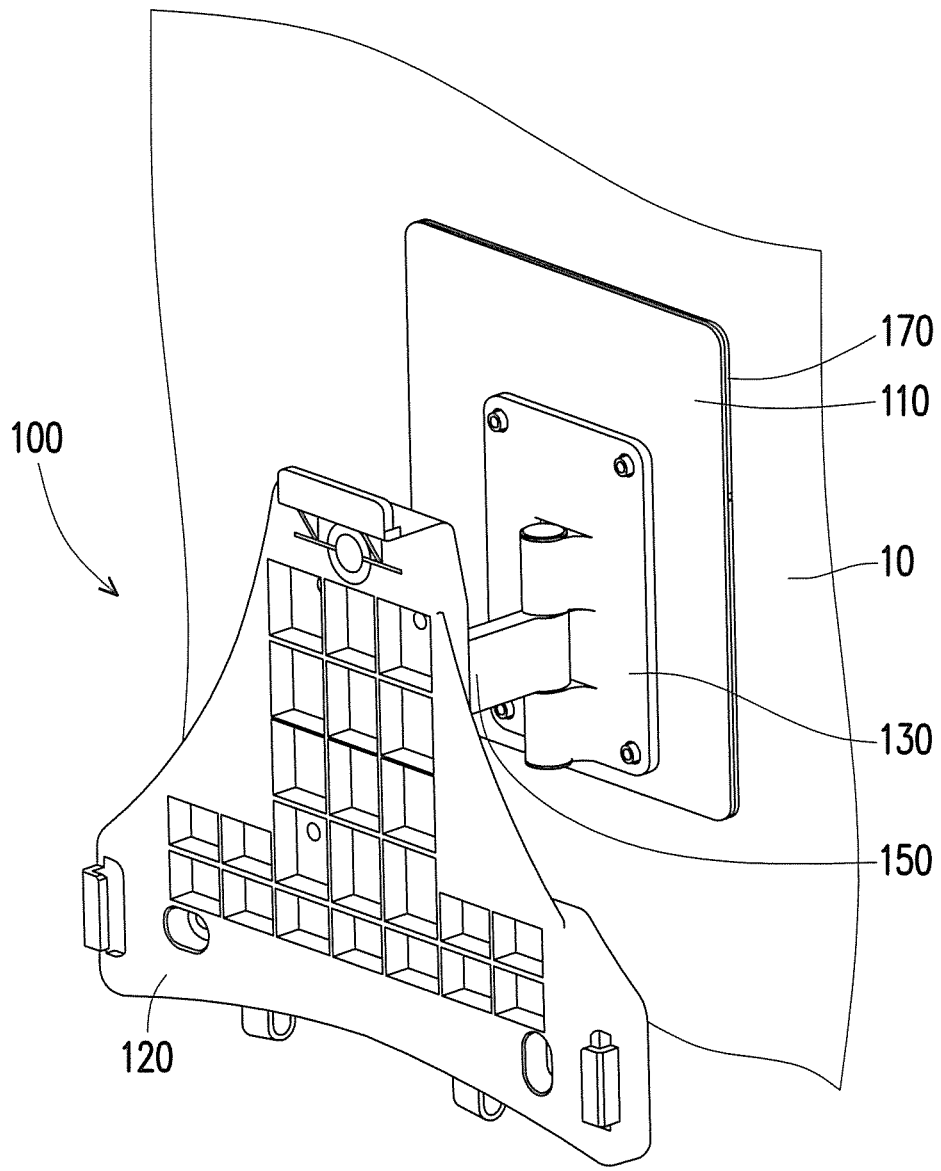
FIG. 1 is a schematic diagram of a fixing structure according to an embodiment of the invention.
Figure 2:
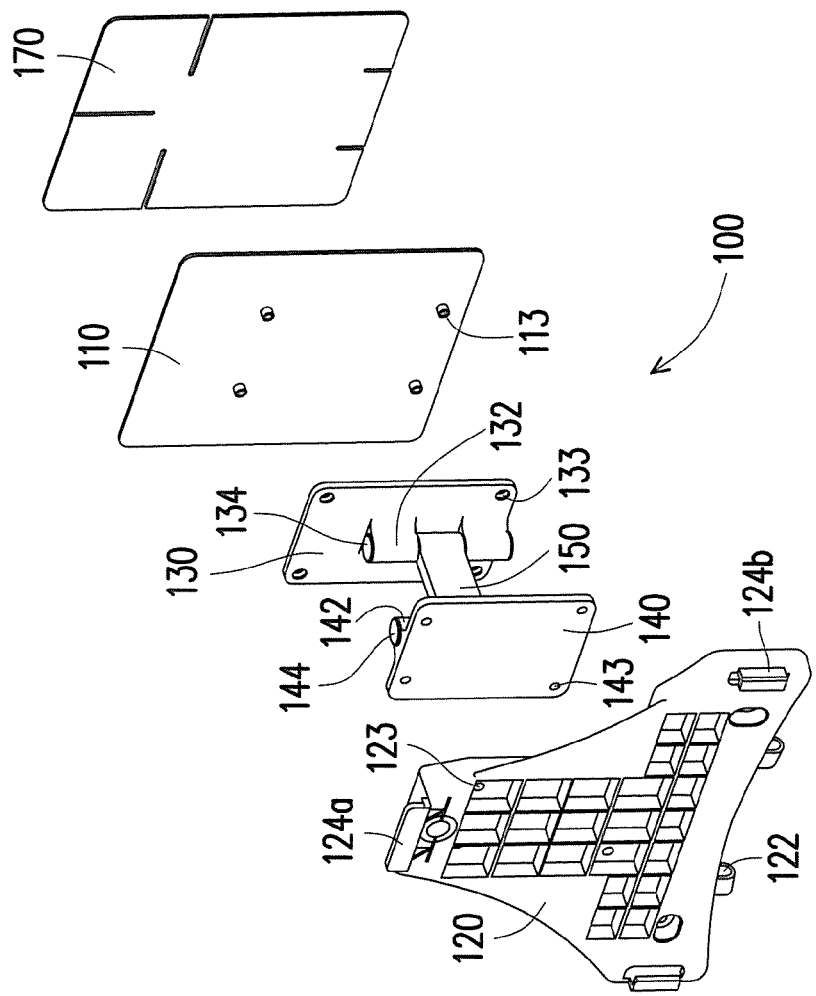
FIG. 2 is an exploded view of the fixing structure of FIG. 1.

FIG. 1 is a schematic diagram of a fixing structure according to an embodiment of the invention. FIG. 2 is an exploded view of the fixing structure of FIG. 1. In the present embodiment, the fixing structure 100 can be used for fixing an electronic device 50 to a carrying plane 10, for example, a wall. The fixing structure 100 includes a fixing plate 110, a carrying frame 120, a first pivot portion 130, a second pivot portion 140 and a connection portion 150. The fixing plate 110 is fixed on the carrying plane 10, and the carrying frame 120 is detachably disposed on a back surface of the electronic device 50. The first pivot portion 130 is disposed on the fixing plate 110 at a side opposite to the carrying plane 10. The second pivot portion 140 is disposed on the carrying frame 120 at a side facing the fixing plate 110. Moreover, the first pivot portion 130 and the second pivot portion 140 are respectively pivoted to two opposite sides of the connection portion 150. In addition, the electronic device 50 and the carrying frame 120 are adapted to be pivotally rotated relative to the carrying plane 10 and the connection portion 150 through the first pivot portion 130 and the second pivot portion 140.

In the present embodiment, the electronic device 50 is, for example, a mobile phone, a tablet personal computer (PC) or other electronic display or camera detecting device. Moreover, the first pivot portion 130 has a first pivot base 132 and a first pivot 134, and the first pivot 134 penetrates through the first pivot base 132 and one of the two opposite sides of the connection portion 150. Moreover, the second pivot portion 140 has a second pivot base 142 and a second pivot 144, and the second pivot 144 penetrates through the second pivot base 142 and the other one of the two opposite sides of the connection portion 150.

In an embodiment, the carrying frame 120 and the electronic device 50 thereon can be pivotally rotated relative to the carrying plane 10 through the connection portion 150 and the first pivot portion 130, and can be further pivotally rotated relative to the second pivot 144 and the connection portion 150 at the same time. For example, as shown in FIG. 1, the carrying frame 120 and the electronic device 50 may be pivotally rotated toward a left side or a right side of the fixing plate 110 by at least 30 degrees, so as to adjust a position of the electronic device 50 relative to the carrying plane 10. Moreover, when the electronic device 50 is fixed to the carrying plane 10 such as a wall, the position of the electronic device 50 relative to the carrying plane 10 can be adjusted to a position suitable for being viewed or used by the user. Particularly, when the user usage a camera function of the electronic device 50, the electronic device 50 can be pivotally rotated to a proper shooting angle relative to the carrying plane 10. Therefore, in the present embodiment, the electronic device 50 may capture images of a face of the user in different angles, such that the electronic device 50 may provide a function similar to that of a mirror. Moreover, when the user uses the electronic device 50 to capture and display the images of the face, the electronic device 50 may perform real-time analysis to the face images captured in different angles and different positions, so as to display a skin and health condition of the face of the user, and meanwhile provide related information such as face care, beauty, health care and related health information.

In the present embodiment, the carrying frame 120 may have at least one wire trimming portion 122 (two wire trimming portions are illustrated) disposed on a bottom of the carrying frame 120. The wire trimming portions 122 are adapted to guide wires (not shown) of the electronic device 50 to extend towards two sides of the carrying frame 120, so as to avoid winding of the wires of the electronic device 50 with the electronic device 50 itself or with other surrounding members during a pivot rotation process or a usage process of the electronic device 50.

Besides, in the present embodiment, a shape of the carrying frame 120 can be a round, an oval a rectangle, a square, a triangle, a rhombus, a polygon or an irregular polygon, etc., which is not limited by the invention. Moreover, the edge of the carrying frame 120 can be configured with a plurality of engaging portions 124a, and 124b. Moreover, the back surface of the electronic device 50 can be configured with a plurality of engaging members (not shown) corresponding to the aforementioned engaging portions 124a and 124b, such that the electronic device 50 can be detachably engaged to the carrying frame through the engaging portions 124a and 124b. In the invention, configuration method of the engaging portions 124a and 124b is not limited to the embodiment shown in FIG. 1 and FIG. 2, and the configuration method of the engaging portions 124a and 124b can be properly adjusted and changed according to an actual usage requirement of the user.

Referring to FIG. 1 and FIG. 2, in the present embodiment, the fixing structure 100 further includes an adhesive member 170 disposed between the fixing plate 110 and the carrying plane 10, so as to adhere and fix the fixing plate 110 to the carrying plane 10. In the present embodiment, in order to increase an adhesion area and an adhesion force between the fixing plate 110 and the carrying plane 10, an area of the fixing plate 110 can be at least three times greater than an area of a carrying plane of the first pivot portion 130, such that the fixing plate 110 can be firmly adhered to the carrying plane 10. In the present embodiment, the fixing structure 100 adhered to the carrying plane 10 may sustain a force or a weight of at least 20 kilograms.

In the present embodiment, the adhesive member 170 is, for example, an adhesive sheet shown in FIG. 2. However, in other embodiment that is not shown, an adhesive agent can be used as the adhesive member 170 for adhering the fixing plate 110 to the carrying plane 10.

In the present embodiment, since the fixing structure 100 is directly adhered to the carrying plane 10 through the adhesive member 170, it is unnecessary to additionally form screw holes on the carrying plane 10 for screw-locking the fixing structure 100 on the carrying plane 10. Therefore, the fixing structure 100 of the invention is adapted to fix the electronic device 50 on the carrying plane 10 that is not suitable for drilling holes thereon. Also, when the electronic device 50 is hanged on the carrying plane 100 (for example, a wall), since it is unnecessary to drill the wall to form screw holes thereon, it is avoided to damage the appearance of the wall surface due to the drilling.

In the present embodiment, referring to FIG. 1 and FIG. 2, the fixing plate 110 has a plurality of bumps 113, and the first pivot portion 130 has a plurality of holes 133 configured corresponding to the bumps 113, where the bumps 113 can be inserted in the holes 113 to fix the first pivot portion 130 to the fixing plate 110.

The carrying frame 120 and the second pivot portion 140 respectively have a plurality of screw holes 123, screw holes 143 configured corresponding to each other. The carrying frame 120 and the second pivot portion 140 can be fixed to each other through the aforementioned screw holes 123 and the screw holes 143 in the screw-locking manner. However, in other embodiment that is not shown, the fixing plate 110 and the first pivot portion 130, and the carrying frame 120 and the second pivot portion 140 can also be fixed to each other through adhesion of an adhesive member or other manner, and the fixing method between components of the fixing structure 100 is not limited by the invention.

Figure 3:
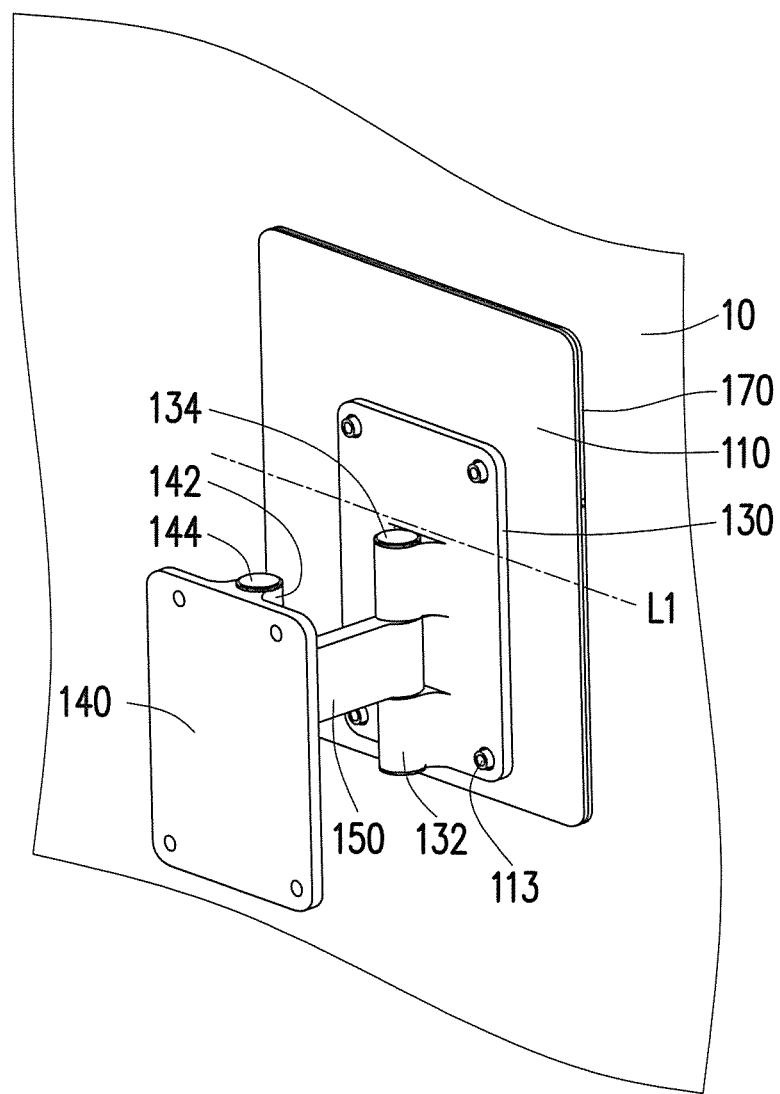
FIG. 3 is a side view of a part of components of the fixing structure of FIG. 1.

FIG. 3 is a side view of a part of components of the fixing structure of FIG. 1. Referring to FIG. 3, in the present embodiment, a configuration position of the first pivot base 132 and the first pivot 134 of the first pivot portion 130 is, for example, located below a half height of the fixing plate 110 along a vertical direction, i.e. lower than a middle height line L1 of the fixing plate 110 in FIG. 3. During the process that the user uses the electronic device 50, when a pressing force from top to bottom is exerted in order to fetch or operate the electronic device 50 fixed on the carrying plane 10, the pressing force probably produces a larger torque relative to the fixing plate 110 and the first pivot portion 130. Through the aforementioned component configuration method, the adhesion force between the fixing plate 110 and the carrying plane 10 is enough to sustain the torque generated by the pressing force, such that the fixing plate 110 is avoided to fall off from the carrying plane 10. In other words, in the aforementioned component configuration method, since a torque generated by the adhesion force between the fixing plate 110 and the carrying plane 10 is greater than the torque generated by the pressing force, when the electronic device 50 is pressed down by an external force, the fixing plate 110 can still be stably adhered on the carrying plane 10.

In summary, the fixing structure of the embodiment of the invention can be used for fixing a display device of an electronic device such as a mobile phone, a tablet PC on various carrying planes, for example, a wall. The electronic device is detachably engaged to the carrying frame of the fixing structure, and the electronic device can be pivotally rotated relative to the fixing plate and the carrying plane through the first pivot portion, the second pivot portion and the connection portion there between. When the electronic device is adhered and fixed to the carrying plane through the fixing structure, a configuration position of the electronic device relative to the carrying plane and user's viewing angle thereof can be adjusted through the first pivot portion and the second pivot portion, so as to improve user's use and viewing convenience. Particularly, by using the fixing structure of the invention, when the user uses an image capturing function or a display function of the electronic device, the electronic device may capture images of the face of the user in different angles and positions, such that the electronic device may provide a function similar to that of a mirror, and may provide a wider reflecting angle compared to a general mirror. Moreover, the electronic device may perform a real-time analysis to the images of different face portions captured in different angles, and meanwhile provide related information such as face care, beauty, health care and related health information.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fixing structure, adapted to be fixed on a carrying plane and to carry an electronic device, the fixing structure comprising:
   a fixing plate, comprising a plurality of bumps, configured to be fixed on the carrying plane;
   a carrying frame, detachably disposed on a back surface of the electronic device;
   a first pivot portion, fixedly disposed on the fixing plate at a side opposite to the carrying plane;
   a second pivot portion, disposed on the carrying frame at a side facing the fixing plate; and
   a connection portion, the first pivot portion and the second pivot portion being respectively pivoted to two opposite sides of the connection portion, wherein the electronic device and the carrying frame are adapted to be pivotally rotated relative to the carrying plane and the connection portion through the first pivot portion and the second pivot portion, respectively,
   wherein the first pivot portion has a first pivot base and a first pivot, and the first pivot penetrates through the first pivot base and one of the two opposite sides of the connection portion, the first pivot portion has a pivoting axis along a vertical direction,
   wherein a configuration position of the first pivot base and the first pivot on the fixing plate is lower than a middle height line of the fixing plate along the vertical direction,
   wherein the first pivot portion is fixedly disposed on the fixing plate by inserting the plurality of bumps on the fixing plate into a plurality of holes in the first pivot portion corresponding to the plurality of bumps.

2. The fixing structure as claimed in claim 1, wherein the carrying frame has at least one wire trimming portion disposed on a bottom of the carrying frame, and the wire trimming portion is adapted to guide wires of the electronic device to extend towards two sides of the carrying frame.

3. The fixing structure as claimed in claim 1, further comprising:
   an adhesive member, disposed between the fixing plate and the carrying plane, wherein the fixing plate is adhered and fixed to the carrying plane through the adhesive member.

4. The fixing structure as claimed in claim 1, wherein a ratio between an area of the fixing plate and an area of the first pivot portion is greater than or equal to 3.

5. The fixing structure as claimed in claim 1, wherein the second pivot portion has a second pivot base and a second pivot, and the second pivot penetrates through the second pivot base and the other one of the two opposite sides of the connection portion.

6. The fixing structure as claimed in claim 1, wherein the carrying frame has a plurality of engaging portions disposed at an edge of the carrying frame, and the electronic device is engaged to the carrying frame through the engaging portions.

7. The fixing structure as claimed in claim 1, wherein a shape of the carrying frame comprises a round, an oval, a rectangle, a square, a triangle, a rhombus, a polygon or an irregular polygon.

8. The fixing structure as claimed in claim 1, wherein the carrying frame is adapted to be pivotally rotated toward two side edges of the fixing plate by at least 30 degrees through the connection portion and the first pivot portion.

* * * * *